June 4, 1968 H. Y. JULIUSBURGER ET AL 3,387,144
CIRCUIT FOR PERIODICALLY SAMPLING ASYNCHRONOUS PULSES
Filed Nov. 4, 1964
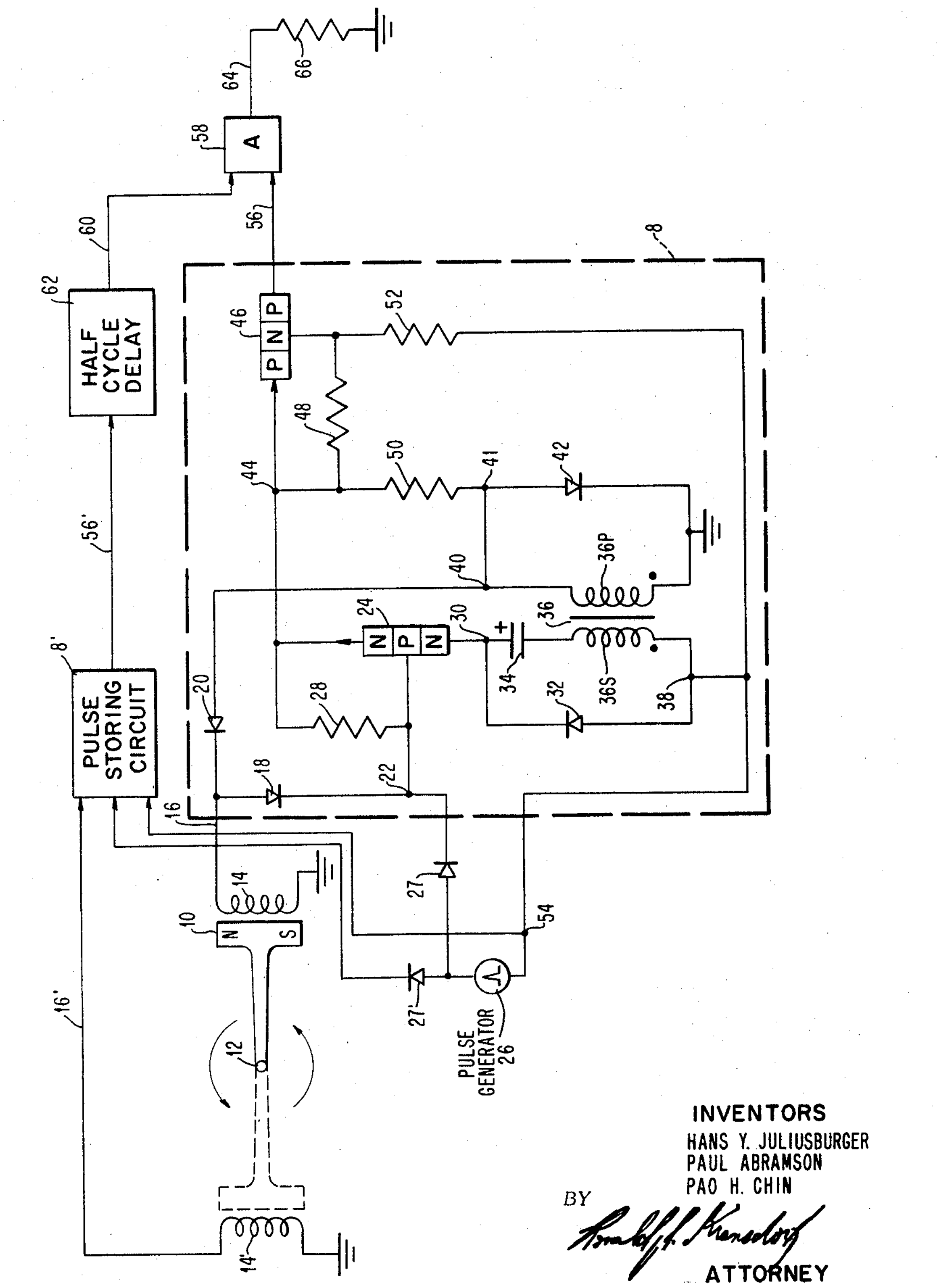
INVENTORS
HANS Y. JULIUSBURGER
PAUL ABRAMSON
PAO H. CHIN
BY
ATTORNEY United States Patent Office
3,387,144
Patented June 4, 1968

3,387,144

CIRCUIT FOR PERIODICALLY SAMPLING ASYNCHRONOUS PULSES

Hans Y. Juliusburger, Putnam Valley, Paul Abramson, Yorktown Heights, and Pao H. Chin, Pleasantville, N.Y., assignors to International Business Machines Corporation, New York, N.Y., a corporation of New York Filed Nov. 4, 1964, Ser. No. 408,814
10 Claims. (Cl. 307—232)

ABSTRACT OF THE DISCLOSURE

A circuit which periodically samples asynchronous pulses occurring at a remote terminal. The circuit includes a capacitor which is charged by one-half of a bi-polar pulse produced at a central station and is discharged by the occurrence of an asynchronous pulse at the terminal. The other half of the bi-polar pulse from the central station is employed to sample whether the capacitor has been discharged by an asynchronous pulse. If an asynchronous pulse has not occurred at the terminal, then the sampling half of the bi-polar pulse is returned to the central station to indicate that the capacitor is still in its charged state. If the sampling half of the bi-polar pulse is not so returned to the central station, it indicates that the capacitor has been discharged, i.e., that an asynchronous pulse has occurred.

This invention relates to a circuit for periodically sampling asynchronous pulses and more particularly to a circuit which is capable of sampling such pulses which occur at a remote terminal without requiring a power supply at the remote terminal.

As industries become increasingly automated, there is an even greater need for monitoring the activities at remote terminals. Co-pending applications, Ser. Nos. 360,-894, now Patent No. 3,362,013, and 379,262 entitled, "Sequential Switching Device," and "Sampling System for Binary Indicators," respectively, which applications are both filed on behalf of Abramson, et. al. and assigned to the assignee of the instant application, show a scheme for monitoring the activities at a plurality of remote terminals which involves the generation of a pluraltiy of bi-polar pulses which are selectively applied to sample the state of contacts at the remote terminals. For this or similar sampling systems to operate effectively, it is necessary that during the sampling interval, the activity being sampled be represented by a closed contact. While for many activities, such as the setting of a switch to indicate a particular alarm condition at a remote terminal or the counting of the number of times that a punch press is operated, a contact is in fact closed at the sampling interval, there is a large class of activity-sampling devices which, when the sampled activity occurs, generate a weak, short-duration pulse rather than effect the closing a contact. Examples of such activity-sampling devices are piezoelectric devices which produce pulses when tapped and magnetic or reluctance devices which produce pulses when magnetic materials pass nearby. Such devices may be used to detect short duration changes in pressure at a terminal being monitored or to count the number of metallic elements passing a given monitoring station.

In order for the asynchronous pulses which are generated by such a pick-up device to be sampled by a periodic sampling device of the type indicated in the above mentioned co-pending applications, some means must be provided to store the information as to the occurrence of the pulse until the central station or central sub-station is again ready to sample the terminal at which the asynchronous pulse occurred. Since, in most applications, a large number of these monitoring devices are employed, it is necessary, in order for the system to be economically feasible, that the individual terminals be of as low cost as possible. It is also important that these terminals be as reliable as possible so as to require a minimum of maintenance. Since power supplies such as batteries are fairly expensive and have a life which is much shorter than that of most electronic components, one way of achieving the above two objectives is to use a circuit at the terminal which does not require a power supply. It is also desirable that the circuit employed at the terminal be capable of indicating to the central station when it is malfunctioning so that suitable remedial action may be taken.

It is therefore an object of this invention to provide a circuit for permitting the periodic sampling of weak asynchronous pulses.

A more specific object of this invention is to provide a circuit which is capable of utilizing periodic pulses generated at a central station or central sub-station to sample the occurrence of a weak asynchronous pulse at a remote terminal.

Another object of this invention is to provide a simple, inexpensive, reliable circuit for storing the occurrence of an asynchronous pulse.

A more specific object of the invention is to provide a circuit of the type described above which may be used at a remote terminal without requiring its own power supply.

Still another object of this invention is to provide a circuit of the type described above which is capable of indicating to the central station when it is malfunctioning.

In accordance with these objects, this invention provides a circuit for permitting the periodic sampling of asynchronous pulses which circuit uses a charge-storing device, such as a capacitor, which is periodically charged by, for example, the second half of a bi-polar pulse from a central station or central sub-station. The charge-storing device is discharged by the occurrence of an asynchronous pulse. A feed-back loop is provided to assure the complete discharge of the charge-storing device. A sampling pulse, for example, the first half of the next bi-polar pulse from the central station or central sub-station, is then applied to the circuit and is passed to an output device which may, for example, lead back to the central station or central sub-station only if the current storing device is still in its charged state. The absence of a pulse from the remote terminal during a sampling interval indicates that an asynchronous pulse has occurred at the terminal since the last sampling interval.

The foregoing and other objects, features and advantages of the invention will be apparent from the following more particular description of a preferred embodiment of the invention as illustrated in the accompanying drawing.

The single drawing is a semi-block schematic diagram of a preferred embodiment of the invention.

Two pulse-stories circuits 8 and 8' are shown in the figure. Since these two circuits are identical, only the elements in circuit 8 are shown and described. Bi-polar sampling pulses are periodically applied to circuits 8 and 8' by the passage of magnet 10, which magnet rotates in a counterclockwise direction at a uniform rate about pivot 12, past pick-up coils 14 and 14' respectively. This sort of a pulse-generating circuit is described in more detail in beforementioned co-pending applications, Ser. Nos. 360,894 and 379,262. From these co-pending cases, it will be seen that coils 14 and 14' are actually two of a plurality of pick-up coils past which magnet 10 rotates. There would be a similar pair of pick-up coils for each asynchronous-pulse-generating remote terminal which it is desired to monitor. Since coils 14 and 14' are 180° out of phase with each other, the bi-polar pulses generated in the coils are likewise 180° out of phase. Each bi-polar pulse is a single sine wave consisting of a positive half-cycle followed by a negative half-cycle. One end of coils 14 and 14' is connected to ground, and the other ends of these coils are connected through lines 16 and 16' respectively to circuits 8 and 8'. While the elements now to be described are shown only for circuit 8, it is always assumed that there is a corresponding prime numbered element in circuit 8'.

Line 16 is connected to the positive terminal of diode 18 and the negative terminal of diode 20. The other terminal of diode 18 is connected through junction 22 to the base of NPN transistor 24. One terminal of pulse generator 26 is connected through diode 27 and junction 22 to the base of transistor 24. The same terminal of pulse generator 26 is connected through diode 27' to circuit 8'. Pulse generator 26 may, for example, be a piezoelectric crystal or a magnetic pick-up coil which generates a low-energy, short-duration pulse when suitably stimulated. The base of transistor 24 is connected through resistor 28 to the emitter of this transistor. The collector of transistor 24 is connected through junction 30 to the negative terminal of diode 32 and to one terminal of capacitor 34. The other terminal of capacitor 34 is connected through secondary coil 36S of transformer 36 and junction 38 to the positive terminal of diode 32.

The positive terminal of diode 20 is connected through junction 40 and primary coil 36P of transformer 36 to ground. Junction 40 is also connected through junction 41 and diode 42 to ground. The emitter of transistor 24 is connected through junction 44 to the emitter of PNP transistor 46. Junction 44 is also connected through resistor 48 to the base of transistor 46 and through resistance 50 to junction 41. The base of transistor 46 is connected through resistor 52 to junctions 38 and 54. Junction 54 is also connected to the other terminal of pulse generator 26 and to circuit 8'. The collector of transistor 46 is connected through line 56 as one input to AND gate 58. The other input to AND gate 58 is output line 60 from half-cycle delay 62. The duration of delay 62 is equal to the time required for magnet 10 to rotate from coil 14' to coil 14. The input to half-cycle delay 62 is output line 56' from circuit 8'. Delay 62 is required to compensate for the 180° time difference between the sampling signals applied to circuits 8 and 8'. Output line 64 from AND gate 58 is connected through load resistor 66 to ground. Load resistor 66 may in fact be located at a central station or central sub-station and be commutated in the manner shown in the beforementioned copending applications, Ser. Nos. 360,894 and 379,262 to indicate to the central station whether an asynchronous pulse has been generated by pulse generator 26 during the time period since the last sampling of the circuit.

In operation, it is assumed that the bi-polar pulses which are periodically applied to lines 16 and 16' each consist of a single, full sine wave having a positive half cycle followed by a negative half cycle and that these two signals are 180° out of phase with each other. Considering only circuit 8 and assuming that capacitor 34 is initially in an uncharged state, the negative half cycle of the pulse applied to line 16 is passed through diode 20, junction 40, and primary coil 36P of transformer 36 to ground. The resulting signal induced in secondary coil 36S of transformer 36 has a positive polarity at the dot-marked terminal and a negative potential at the other terminal. This results in a current which flows from the dot-marked terminal of coil 36S through junction 38, diode 32, and junction 30 to charge capacitor 34 with a positive potential on its upper terminal and a negative potential on its lower terminal. The desired charge is in this manner placed on capacitor 34 at the end of each sampling of the circuit. A half cycle later, the capacitor in circuit 8' is charged in a similar manner.

Once capacitor 34 is charged, it remains charged until either a new sampling pulse is applied to line 16 or pulse generator 26 generates an output pulse. If pulse generator 26 generates an output pulse, a signal is applied through diode 27 junction 22, the base emitter junction of NPN transistor 24, junction 44, the emitter base junction of transistor 46, resistor 52 and junction 54 to the other terminal of the pulse generator. It should be noted that the output pulse from generator 26 is also applied through diode 27' to pulse-storing circuit 8'. However, since the pulse-storing action in circuit 8' is identical to that in circuit 8, only pulse-storing operation in circuit 8 will be described. The signal applied through the base emitter junction of transistor 24 renders this transistor conductive, allowing capacitor 34 to begin discharging through transistor 24, junction 44, the emitter-base, PN, junction of transistor 46, resistor 52, junction 38, and secondary coil 36S of transformer 36. Since the pulse from pulse generator 26 is generally of short duration, transistor 24 would ordinarily be cut off long before capacitor 34 had completely discharged. However, the discharge signal passing through secondary coil 36S of transformer 36 causes a signal to be induced in primary coil 36P of this transformer. This feed-back signal flows in a direction from the unmarked terminal of coil 36P to the dot-marked terminal of this coil through a path which includes the ground terminal just below the primary coil 36P, primary coil 36P, junction 40, junction 41, resistor 50, junction 44, the emitter-base, NP, junction of transistor 24, junction 22, diode 18, line 16, and coil 14 to ground. The current flowing through the emitter-base junction of transistor 24 maintains this transistor conducting even when the pulse from pulse generator 26 has terminated, thereby allowing capacitor 34 to completely discharge.

When the next sampling pulse is applied to coil 14, the positive half cycle of this pulse is applied through line 16, diode 18, junction 22, the base-emitter junction of transistor 24, junction 44, resistor 50, junction 41 and diode 42 to ground. Diode 42 effectively short-circuits the positive signal applied to junction 41 to ground, preventing any appreciable current flow through transformer coil 36P. Current flow in coil 36P would induce a signal in coil 36S which could cause a spurious output from the circuit. At this time, resistor 28 protects the base-emitter junction of transistor 24 from being overloaded by providing a bypass path for a portion of the positive signal applied to junction 22. In order for a portion of the positive pulse applied to junction 44 to pass through transistor 46 to circuit output line 56, the base-emitter junction of this transistor must be forward-biased at this time. If capacitor 34 is discharged at this time, meaning that an asynchronous pulse occurred during the time interval since the last sampling pulse, there is no potential applied to the base of transistor 46 which is negative with respect to the potential applied to the emitter of this transistor and the base-emitter junction of this transistor is therefore back-biased, preventing an output signal from being applied to output line 56. There is therefore no signal on output line 56 during the time interval that a signal is applied to coil 14 if an asynchronous pulse has been generated by pulse generator 26 during the time interval since the last sampling pulse.

If, on the other hand, capacitor 34 is still charged when a sampling signal is applied to coil 14, meaning that no asynchronous pulse was generated by pulse generator 26 during the preceding time interval, the signal flowing through the base-emitter junction of transistor 24 renders this transistor conductive, allowing capacitor 34 to discharge through the same discharge path previously described. This path is from the upper terminal of capacitor 34 through junction 30, transistor 24, junction 44, the emitter-base junction of transistor 46, resistor 52, junction 38, and secondary coil 36S of transformer 36 to the lower terminal of capacitor 34. The current flowing through the emitter-base junction of transistor 46 renders this transistor conductive, allowing a portion of the positive sampling pulse applied to the emitter of this transistor to pass through transistor 46 to output line 56. The portion of the positive sampling pulse applied to line 56 is proportional to the ratio between the value of resistor 50 and the load attached to line 56. A signal therefore appears on output line 56 from circuit 8 when there has been no asynchronous pulse generated by pulse generator 26 during the time interval since the last sampling pulse.

It would appear from the description of the operation given so far that the output signal on line 56 could be applied directly to load resistor 66 to indicate whether an asynchronous pulse has occurred during the time interval since the last sampling pulse. However, when this is done, there is a finite possibility that a pulse generated by an asynchronous pulse generator 26 will not be detected. This occurs when the pulse from pulse generator 26 occurs at the same time that a sampling pulse is applied to coil 14. Since the pulse from pulse generator 26 is of short duration, it would be completely obliterated by the positive half-cycle of the sampling pulse and would be of insufficient duration to prevent the full charging of the capacitor to occur during the negative half-cycle of the sampling pulse. While in many applications the probability of losing an asynchronous pulse may be reduced to a tolerable 1% or less by having a large ratio of spacing between sampling pulses to duration of asynchronous pulses, there are some applications where it is undesirable to lose any of the asynchronous pulses. In the former applications, circuit 8 may be used alone, and output line 56 connected directly to load resistor 66. In the latter applications, where no error can be tolerated, circuit 8' is also employed as shown in the figure.

It has been assumed throughout that the rate at which pulses are generated by pulse generator 26 is less than the rate at which sampling pulses are applied to coil 14 so that no more than one asynchronous pulse ever occurs during a sampling interval. Since sampling pulses are applied to coils 14 and 14' at time intervals which are separated from each other by a time period which is equal to a half-cycle of rotation of magnet 10, it is impossible for a pulse from pulse generator 26 to occur simultaneously with the sampling of pulses applied to both these lines. Therefore, a given pulse will be detected either by circuit 8 or by circuit 8' no matter when it occurs. In most instances, it will be detected by both circuits. If a pulse has not been detected by circuit 8', an output signal is generated on line 56' when a sampling pulse is applied to coil 14' and, a half-cycle later, a signal is applied by delay 62 to one input of AND gate 58. If, at the same time, circuit 8 has detected no pulse from pulse generator 26, there is an output signal on line 56 from circuit 8, fully conditioning AND gate 58 to generate an output signal on line 64 which is applied to load resistor 66. A signal is therefore applied to load resistor 66 only if there is a failure to detect a pulse by both circuits 8 and 8'.

If, on the other hand, the pulse generated by pulse generator 26 occurred simultaneously with a sampling pulse being applied to coil 14, circuit 8 would still generate an output signal on line 56 at the next sampling interval. However, the capacitor in circuit 8' would be discharged at this time, and a half-cycle later when a signal was applied to coil 14' there would be no output signal on line 56' from circuit 8'. Therefore, the next time that a sampling pulse was applied to coil 14, there would be a signal on line 56, but there would be no signal on output line 60 from half-cycle delay 62. AND gate 58 would therefore not be fully conditioned and there would be no signal applied to load resistor 66. If the asynchronous pulse occurred at a time when a sampling signal was being applied to neither coil 14 nor 14', the next time sampling signals were applied to these coils, there would be no output signal on either line 56 or 56', and neither input to AND gate 58 would be present.

One added advantage of the circuit of this invention is that it is self-checking. It has been assumed that the rate at which pulse generator 26 generates pulses is somewhat less than the rate at which sampling pulses are applied to coils 14 or 14'. Therefore, there should be signals applied to load resistor 66 at least every few cycles. If, for a predetermined number of cycles, there has been no signal applied to load resistor 66, this may be used as an indication that the circuit is malfunctioning and cause suitable remedial action to be initiated.

While in the figure, coils 14 and 14' have been shown as being 180° apart, these coils may in fact be adjacent to each other or be spaced in any other desired way. Since the pulse from generator 26 is of short duration relative to the sampling pulses, the pulse from generator 26 cannot occur simultaneously with the application of sampling pulses to two coils no matter how close together or far apart these coils are spaced.

While the invention has been particularly shown and described with reference to a preferred embodiment thereof, it is to be understood by those skilled in the art that the foregoing and other changes in form and details may be made therein without departing from the spirit and scope of the invention.

What is claimed is:

1. A circuit for permitting the periodic sampling of low-energy asynchronous pulses comprising:
- a charge-storing means;
- means for periodically charging said charge-storing means;
- means responsive to one of said low-energy asynchronous pulses for permitting said charge storing means to start discharging;
- means responsive to the discharging of said charge-storing means for permitting said charge-storing means for permitting said charge-storing means to become fully discharged; and
- means for periodically sampling said circuit to determine whether said charge-storing means is in its charged or discharged state.

2. A circuit for permitting asynchronous, low-energy pulses to be sampled by periodic bi-polar pulses comprising:
- a charge-storing means;
- means for applying the second half of each of said bi-polar pulse to charge said charge-storing means;
- means responsive to one of said low-energy asynchronous pulses for permitting said charge storing means to start discharging;
- means responsive to the discharging of said charge-storing means for permitting said charge-storing means to become fully discharged;
- an output device; and
- means for applying the first half of each of said bi-polar pulses to said output device only when said charge-storing means is in its charged state.

3. A circuit for permitting asynchronous, low-energy pulses to be sampled by periodic bi-polar pulses comprising:
- a capacitor;
- means for applying the second half of each of said bi-polar pulse to charge said capacitor;
- means responsive to one of said low-energy asynchronous pulses for permitting said capacitor to start discharging;
- means responsive to the discharging of said capacitor for permitting said capacitor to become fully discharged;
- an output device; and
- means for applying the first half of each of said bi-polar pulses to said output device only when said capacitor is in its charged state.

4. A circuit for permitting asynchronous, low-energy pulses to be sampled by a periodic sampling device comprising:
- means for generating first and second trains of bi-polar sampling pulses;

first and second pulse-storing circuits, each respectively having first and second charge-storing means;

means for applying the second half of a first train bi-polar pulse to charge said first charge-storing means and for applying the second half of a second train bi-polar pulse to charge said second charge-storing means;

means responsive to one of said asynchronous pulses for fully discharging both of said charge-storing means;

a coincident device;

means for applying the first half of a first train bi-polar pulse to said coincident device only when said first charge-storing means is in its charged state;

means for applying the first half of a second train bi-polar pulse to said coincident device only when said second charge-storing device is in its charged state;

an output device; and means for applying the output from said coincident device to said output device.

5. A circuit for permitting asynchronous, low-energy pulses to be sampled by a periodic sampling device comprising:

means for generating first and second trains of bi-polar sampling pulses;

first and second pulse-storing circuits, each respectively having a first and second charge-storing means;

means for applying the second half of a first bi-polar pulse to charge said first charge-storing means and for applying the second half of a second bi-polar pulse to charge said second charge-storing means;

means responsive to one of said asynchronous pulses for permitting both of said charge-storing means to start discharging;

means responsive to the discharging of each of said charge-storing means for permitting the charge-storing means to become fully discharged;

a coincident device;

means for applying the first half of a first bi-polar pulse to said coincident device only when said charge-storing means is in its charged state;

means for applying the first half of a second bi-polar pulse to said coincident device only when said second charge-storing device is in its charged state;

an output device; and means for applying the output from said coincident device to said output device.

6. A circuit for permitting asynchronous, low-energy pulses to be sampled by periodic bi-polar pulses comprising:

a capacitor;

means for applying the second half of said bi-polar pulse to charge said capacitor;

a gating means;

means responsive to one of said asynchronous pulses for conditioning said gating means to permit said capacitor to start discharging;

means responsive to the discharging of said capacitor for maintaining said gating means conditioned until said capacitor is fully discharged;

an output device; and means for applying the first half of each of said bi-polar pulses to said output device only when said capacitor is in its charged state.

7. A circuit for permitting asynchronous, low-energy pulses to be sampled by periodic bi-polar pulses comprising:

a capacitor;

means for applying the second half of each of said bi-polar pulses to charge said capacitor;

a first gating means;

means responsive to one of said asynchronous pulses for conditioning said first gating means to permit said capacitor to start discharging;

means responsive to the discharging of said capacitor for maintaining said first gating means conditioned until said capacitor is fully discharged;

an output device;

means for applying the first half of each of said bi-polar pulses to condition said first gating means to permit said capacitor to discharge;

a second gating means; and means responsive to the discharging of said capacitor for conditioning said second gating means to pass said first half of the bi-polar pulse to said output device.

8. A circuit for permitting asynchronous, low-energy pulses to be sampled by a periodic sampling device comprising:

means for generating first and second trains of bi-polar sampling pulses;

first and second pulse-storing circuits, each having a capacitor, a first gating means, and a second gating means;

means for applying the second half of a first train bi-polar pulse to charge said capacitor of said first circuit and for applying the second half of a second train bi-polar pulse to charge said capacitor of said second circuit;

means responsive to one of said asynchronous pulses for conditioning each of said first gating means to permit the corresponding capacitor to start discharging;

means responsive to the discharging of one of said capacitors for maintaining the corresponding first gating means conditioned until the capacitor is fully discharged;

a coincident device;

means for applying the first half of a first train bi-polar pulse used to charge said first circuit capacitor to condition the corresponding first gating means to permit the said first circuit capacitor to discharge and for applying the first half of a second train bi-polar pulse used to charge said second circuit capacitor to condition the other of said first gating means to permit said second circuit capacitor to discharge;

means responsive to the discharging of each of said capacitors for conditioning the corresponding second gating means to pass the first half of the corresponding bi-polar pulse applied to start the capacitor discharging to said coincident device;

an output device; and means for applying the output from said coincident device to said output device.

9. A circuit for permitting asynchronous, low-energy pulses to be sampled by periodic bi-polar pulses comprising:

a charge-storing device;

means for applying the second half of each of said bi-polar pulses to charge said charge-storing device;

a first gating means;

means for applying said asynchronous pulses to the conditioning input of said first gating means to render said first gating means conductive, said charge-storing device being connected to discharge through said first gating means when said first gating means is conductive;

a second gating means and a transformer coil in the discharge path of said charge-storing means;

a feed-back path including the other coil of said transformer and said first gating means whereby, when said charge-storing means is discharging, said first gating means is maintained conductive by the current flowing in said feed back path;

means for applying the first half of each of said bi-polar pulses to the conditioning input of said first gating means to render said first gating means conductive;

an output device; and means for applying the first half of each of said bi-polar pulses to said second gating means, said second gating means being conditioned to pass said first half of said bi-polar pulses to said output device only when said charge-storing device is discharging through it.

10. A circuit for permitting asynchronous, low-energy pulses to be sampled by periodic bi-polar pulses comprising:

a capacitor;

means for applying the second half of each of said bi-polar pulses to charge said capacitor;

a first transistor;

means for applying said asynchronous pulses to the conditioning input of said first transistor to render said first transistor conductive, said capacitor being connected to discharge through said first transistor when said first transistor is conductive;

a second transistor and a transformer coil in the discharge path of said capacitor;

a feed-back path including the other coil of said transformer and said first transistor whereby, when said capacitor is discharging, said first transistor is maintained conductive by the current flowing in said feed-back path;

means for applying the first half of each of said bi-polar pulses to the conditioning input of said first transistor to render said first transistor conductive;

an output device; and means for applying the first of each of said bi-polar pulses to said second transistor, said second transistor being conditioned to pass said first half of said bi-polar pulses to said output device only when said capacitor is discharging through it.

References Cited

UNITED STATES PATENTS 2,834,883 5/1958 Lukoff ---------- 328—151 X

ARTHUR GAUSS, *Primary Examiner.*

J. D. FREW, *Assistant Examiner.*